Nov. 1, 1966  S. FRINDEL  3,281,945
ADJUSTMENT DEVICE
Filed April 29, 1964  3 Sheets-Sheet 1

INVENTOR
SÉBASTIEN FRINDEL
BY Robertson Smythe & Bryan
ATTORNEYS

Nov. 1, 1966  S. FRINDEL  3,281,945
ADJUSTMENT DEVICE

Filed April 29, 1964  3 Sheets-Sheet 3

INVENTOR
SÉBASTIEN FRINDEL
BY
*Smyth & Moore*
ATTORNEYS

3,281,945
ADJUSTMENT DEVICE

Sébastien Frindel, Annecy, France, assignor to Societe Anonyme Societe Alsacienne de Constructions Atomiques de Telecommunications et d'Electronique "Alcatel," Paris, France, a corporation of France
Filed Apr. 29, 1964, Ser. No. 363,576
Claims priority, application France, May 4, 1963, 933,713
3 Claims. (Cl. 33—170)

This invention relates to a device allowing fine adjustments of very high sensitivity.

Various methods of carrying out fine, precision adjustments are already known.

An object of this invention is to provide a device by the use of which it is possible to obtain extremely precise adjustments by the relative displacement of spherical or cylindrical surfaces.

The device which is the object of this invention consists essentially of a surface-plate on which moves a carriage the upper part of which has a cylindrical profile, and which is given a horizontal movement of translation by control means acting on the said carriage in antagonism to a spring which maintains constant contact between the said control means and the carriage, a sphere guided in a sleeve being placed on the cylindrical face of the said carriage in such a way that it can only receive from it a single movement along an axis perpendicular to the translation axis of the carriage.

The control means may be provided by a fine threaded screw, a differential screw or a cam having a slightly inclined active surface.

The tension of the spring is preferably adjustable.

An embodiment of the device according to the invention is described hereinafter by way of a nonlimitative example, reference being had to the appended drawings in which.

Figure 1:
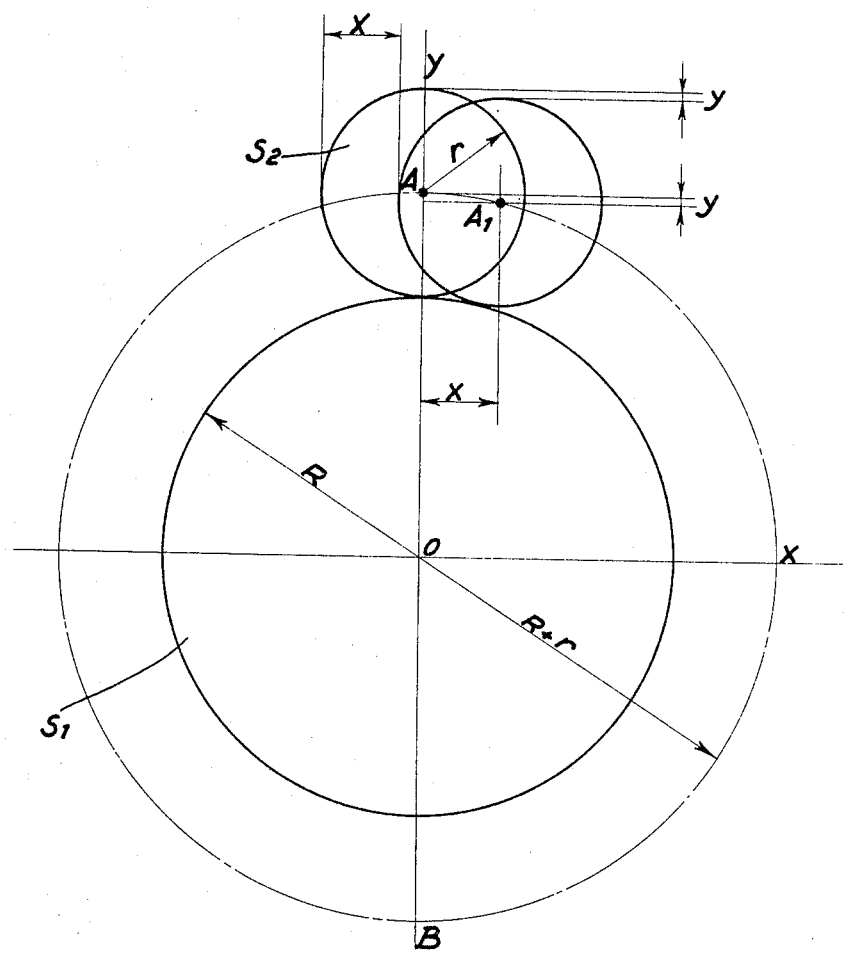
FIG. 1 is a sketch to make the principle of the device clearer.
Figure 2:
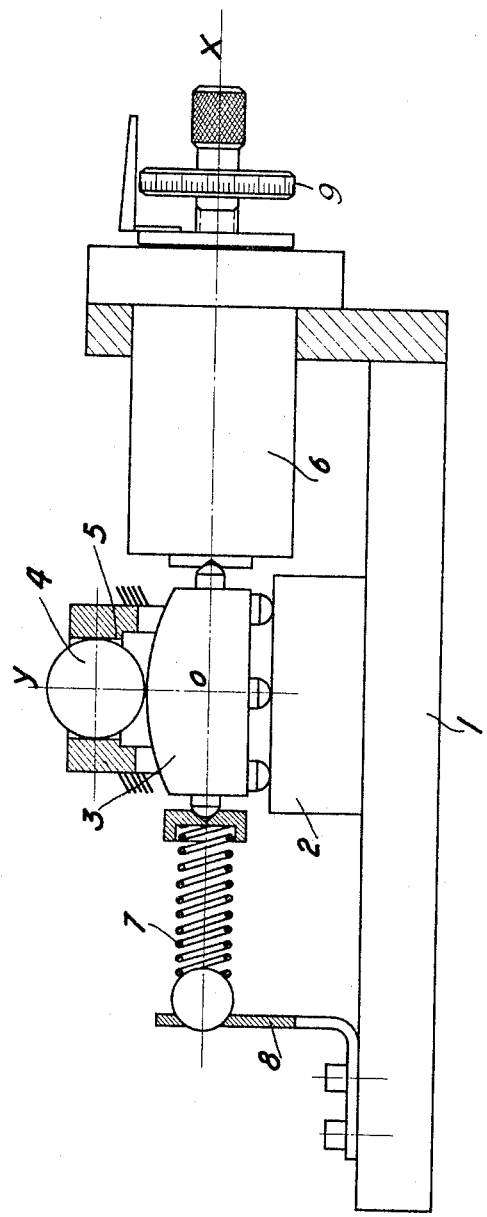
FIG. 2 is a diagrammatic part sectional, side elevational view of the device.
Figure 3:
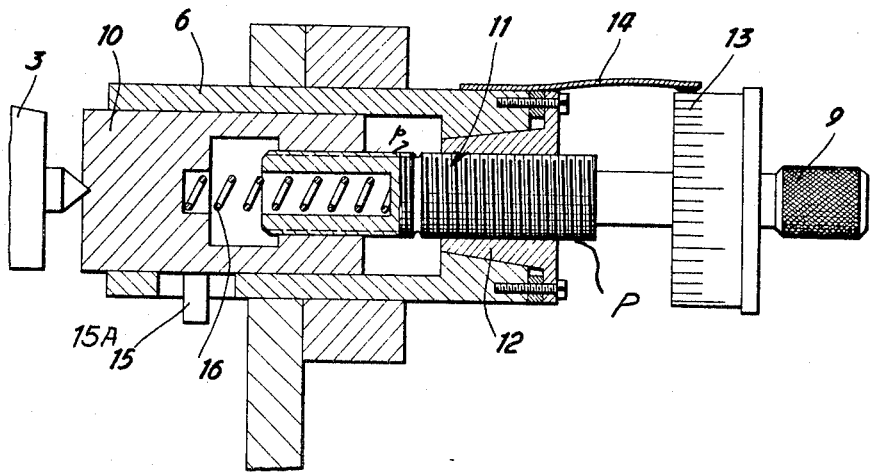

The device is based on the following argument:

Given two spheres $S_1$ and $S_2$, having radii $R$ and $r$, represented respectively in section by their plane of common symmetry $o\ x\ y$ in FIGURE 1.

In the system of axes $ox$, $oy$, the co-ordinates of the centers of spheres $S_1$ and $S_2$ are respectively $[0.0]$ and $[0(R+r)]$.

If the sphere $S_1$ remaining fixed, sphere $S_2$ is displaced by a quantity $x>0$ (for $x<0$ the same properties exist), while maintaining the two spheres tangential, it is seen that the center A of sphere $S_2$ falls at a point $A_1$ having as co-ordinates $[x, (R+r-y)]$ and, in the triangle rectangle $AA_1B$, there is:

$$x^2 = [2(R+r)-y]y \qquad (1)$$

a relation in which $y$ represents the small displacement to be carried out. By hypothesis there will always be $(R+r) \gg y$ so that (1) becomes $$x^2 \cong 2y(R+r) \qquad (2)$$

from which $$y = x^2/2(R+r) \qquad (3)$$

Equation (3) shows that $y$ is of the second order in relaion to $x$; in addition the value of $(R+r)$ may be of a size chosen arbitrarily.

In the neighborhood of $x=0$ there exists, therefore, an adjustment of very great sensitivity.

This argument is valid for the relative displacement of a sphere and a straight circular cylinder or of two straight circular cylinders.

The device according to the invention comprises essentially a base 1 acting as a support to a surface-plate 2 on which a carriage 3 having a cylindrical profile moves in translation.

The displacement following $ox$ of carriage 3 is obtained by a control device or system 6, in this case a differential screw. A spring 7, the tension of which is regulated by the position of a bracket 8, maintains contact between the carriage and its control device. A sphere 4 rests on the cylindrical surface of the carriage, this sphere is guided in the bore of sleeve 5 and can only follow one movement of translation; that parallel to $oy$.

A displacement of carriage 3 following $ox$ induces a movement of sphere 4 following $oy$.

In the particular embodiment described, the control device is a differential screw 6, of the conventional type, such as, shown in U.S. Patent No. 2,338,271 issued January 7, 1944, with a thread of 1.00 and 0.99, that is to say, that for one turn of the graduated drum 9 of the control device screw, the carriage 3 is moved 0.01 mm.; the corresponding displacement of the summit of sphere 4 is, according to the preceding Equation 3, with $R+r=50$ cm.

$$y = 10^{-4}/100 = 10^{-6} \text{ mm.} = 0.001\mu$$

For ten turns of the screw, starting from the highest position of sphere 4, this is lowered by $$y = 10^{-2}/100 = 10^{-4} \text{ mm.} = 0.1\mu$$

The variations are not linear, as Equation 3 shows, but this is of no importance in an adjustment system.

If the principle is to be applied to a metrological apparatus, it is sufficient to graduate drum 9 of the control device as a function of the real displacements of sphere 4.

Numerous other methods of application are possible. Among others, carriage 3 may be replaced by a sphere which slides in a bore having an axis perpendicular to the axis of the guiding bore of sphere 4, the two bore axes lying in the same plane.

The control device 6 may be replaced by any other device such as a simple screw having a fine thread or a sloping cam with a slight slope, these examples not being limitative.

What I claim is:

1. A device for the very highly sensitive adjustment of movements in translation of a mobile mechanical piece, comprising in combination, a plate having surface plate flatness resting on a base; a mobile mechanical piece having a first surface of revolution; means for supporting said mechanical piece on said plate for movement such that all points on said surface of revolution move along lines that are parallel to said surface plate, said means consisting of at least three legs riding on said plate; an element constituting a ball means in tangential engagement with the first surface of revolution of said mechanical piece; means for constraining said element to movement at right angles to said surface plate; michrometric means consisting of a differential screw for moving said mechanical piece parallel to said plate; and resilient means consisting of a coil spring in axial alignment with said micrometric means and abutting said mechanical piece in opposition to said micrometric means, the remote end of said spring being held by a ball, said ball being fixedly supported by a bracket cooperating with said plate.

2. The device according to claim 1, in which said element is a cylindrical surface, the generating lines of the said element being perpendicular to the direction of the movement in translation of the means of support of the said element.

3. The device according to claim 1 in which the first surface of revolution, solid with the mechanical piece to be displaced, is an element having a spherical surface.

References Cited by the Examiner

UNITED STATES PATENTS

| | | | |
|---|---|---|---|
| 890,590 | 6/1908 | Anderson | 33—156 |
| 1,169,327 | 1/1916 | Hess | 33—178 |
| 1,771,907 | 7/1930 | Abramson | 74—110 |
| 2,481,648 | 9/1949 | Dehn | 235—61 |
| 2,589,096 | 3/1952 | Landergren | 74—110 |
| 2,661,765 | 12/1953 | Tray | 74—107 |

FOREIGN PATENTS 338,703  11/1930  Great Britain.

OTHER REFERENCES

"Simple Comparator for Small Work," May 10, 1957 issue of Metalworking Production, vol. No. 19, pp. 802–804.

LEONARD FORMAN, *Primary Examiner.*

ISAAC LISANN, *Examiner.*

B. A. DONAHUE, *Assistant Examiner.*